(12) United States Patent
Cavallo et al.

(10) Patent No.: US 6,536,642 B1
(45) Date of Patent: Mar. 25, 2003

(54) APPARATUS FOR SEPARATING THE BEARING CAP OF A CONNECTING ROD BY FRACTURE

(75) Inventors: Giorgio Cavallo, Borgaro Torinese (IT); Marco Martinis, Turin (IT)

(73) Assignee: Vigel S.p.A., Borgaro Torinese (IT)

( * ) Notice: Subject to any disclaimer, the term of this patent is extended or adjusted under 35 U.S.C. 154(b) by 0 days.

(21) Appl. No.: 09/656,866

(22) Filed: Sep. 7, 2000

(30) Foreign Application Priority Data

Sep. 14, 1999 (IT) ......................................... TO99A0780

(51) Int. Cl.[7] .................................................. B26F 3/00
(52) U.S. Cl. ...................... 225/101; 225/103; 29/888.09
(58) Field of Search ........................ 225/96, 96.5, 100, 225/101, 104, 105; 29/888.09, 413, 416, 888.091, 888.092

(56) References Cited

U.S. PATENT DOCUMENTS

| | | | | |
|---|---|---|---|---|
| 4,768,694 A | * | 9/1988 | Fabris et al. ................... 225/94 |
| 5,108,021 A | * | 4/1992 | Vines ............................. 225/2 |
| 5,154,333 A | * | 10/1992 | Bauer et al. .................... 225/1 |
| 5,169,046 A | * | 12/1992 | Miessen et al. .............. 225/100 |
| 5,263,622 A | * | 11/1993 | Henzler et al. .............. 225/103 |
| 5,283,938 A | * | 2/1994 | Jones ........................... 29/416 |
| 5,320,265 A | * | 6/1994 | Beck ........................... 225/104 |
| 5,503,317 A | * | 4/1996 | Jones et al. .................. 225/103 |
| 5,699,947 A | * | 12/1997 | Cavallo et al. .............. 225/101 |

* cited by examiner

Primary Examiner—M. Rachuba
(74) Attorney, Agent, or Firm—Guido Modiano; Albert Josif; Daniel O'Byrne

(57) ABSTRACT

A frame (10) carries two fixtures (16, 20), of which at least one (20) is movable, and which have respective crescents (18, 22) adapted to be brought together to form a circular profile engageable with the big end of a connecting rod and separable by opening means for fracturing the big end of the connecting rod. The apparatus also has transfer means (58) for transferring a connecting rod from a rod conveyor line (12) to said crescents (18, 22) and vice versa; an actuator (60) for pressing a locking member (62, 162, 262) against portions of the rod body in order to lock the rod body against the crescent facing the body; another actuator (64) for pressing a profiled block (66) against the other end of the connecting rod in order to lock it against the crescent proximate to the cap; an auxiliary actuator (23, 25) for remating the cap with the body of the rod; and ejector means (68, 70, 72) for ejecting the connecting rod from the crescents and for returning it to the transfer means after its fracturing and remating.

7 Claims, 5 Drawing Sheets

APPARATUS FOR SEPARATING THE BEARING CAP OF A CONNECTING ROD BY FRACTURE

BACKGROUND OF THE INVENTION

This invention is concerned with an apparatus for separating the bearing caps of connecting rods by fracture, with subsequent remating of the parts and screwing of the union bolts. The process is suitable for connecting rods having either a cracking plane that is at right angles or that is askew to the body of the connecting rod.

Separation of the cap from the body of the connecting rod by fracture has been known for several years. More particularly, IT-A-1.268.130 describes a process and apparatus for implementing the separation of the cap from the body of a connecting rod in a way that minimizes deformation of the workpiece caused by yield stress, i.e. in a way that gives rise to a so-called fragile fracture.

SUMMARY OF THE INVENTION

The object of the present invention is now to provide an apparatus that improves the process and the apparatus of the above prior patent, more particularly by automating the entire operating cycle.

Another object is to provide an apparatus having a high flexibility of operating conditions, so that the apparatus can be readily adapted to fracture connecting rods of different materials, shapes and sizes.

The invention achieves the above and other objects and advantages, such as will appear from the following disclosure, with an apparatus for separating the bearing cap of a connecting rod by fracture having the essential features set out in claim 1.

The dependent claims define other advantageous features of the invention.

BRIEF DESCRIPTION OF THE DRAWINGS

The invention will be further described with reference to a preferred embodiment, which is illustrated, by way of nonlimiting example, in the attached drawings, wherein.

DESCRIPTION OF PREFERRED EMBODIMENTS

Figure 1:
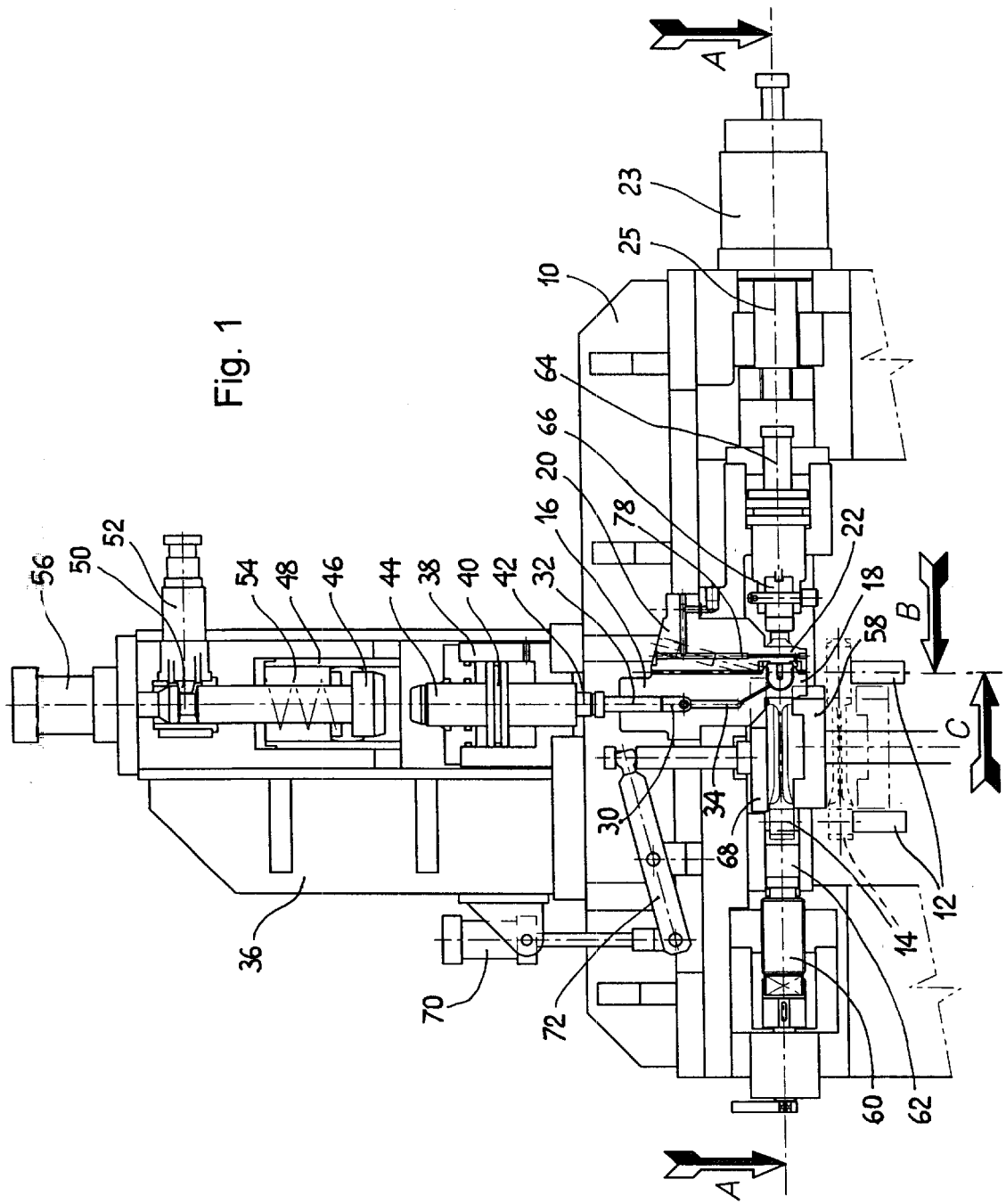
FIG. 1 is a diagrammatic, cross-elevation view of an apparatus for separating the bearing cap of a connecting rod by fracture according to a preferred embodiment of the invention.
Figure 2:
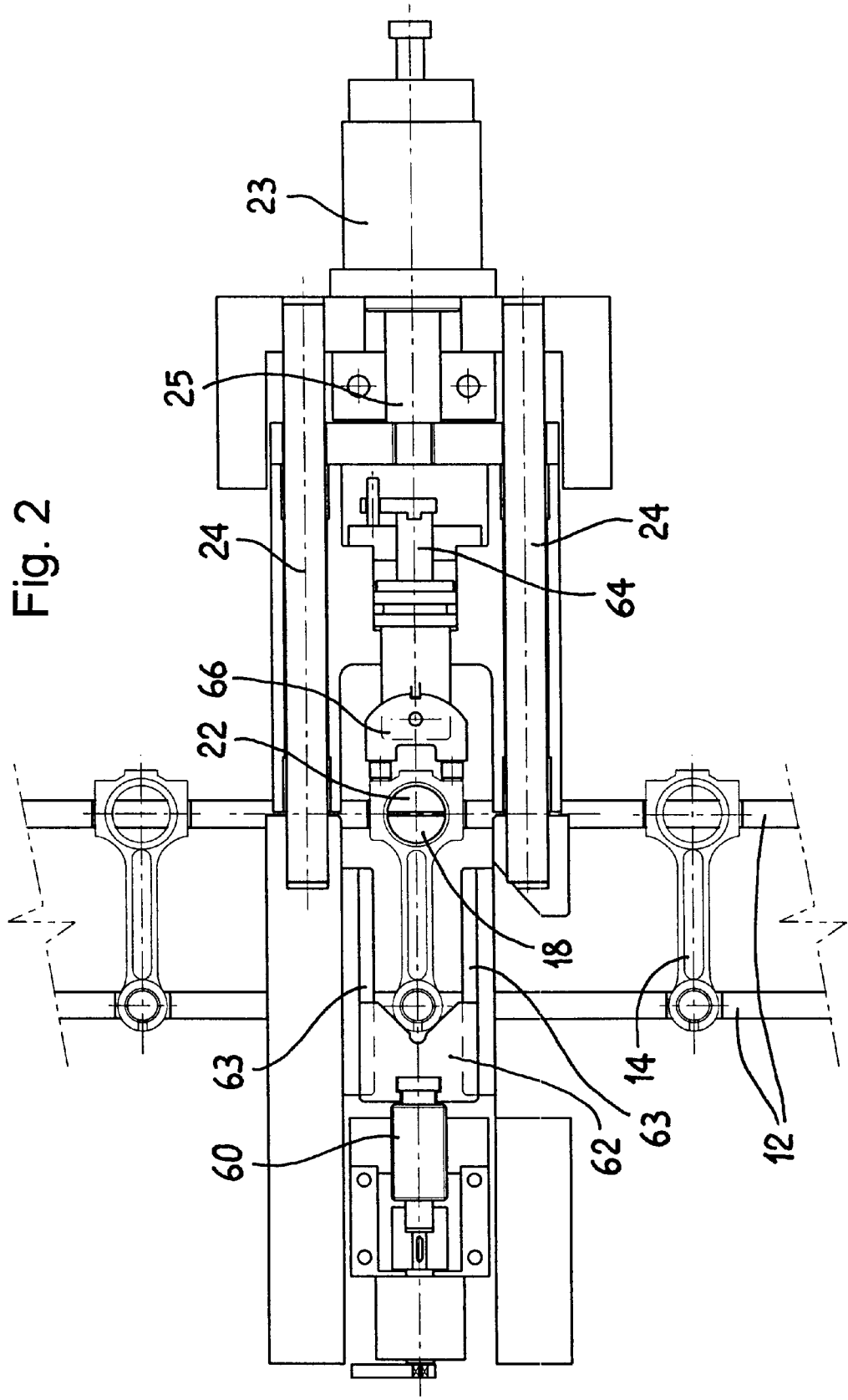
FIG. 2 is a plan view of the apparatus of FIG. 1, in cross-section made along plane AA.

With reference to FIGS. 1 to 5 of the drawings, the apparatus of the invention comprises a stationary, portal-shaped frame 10 extending transversely above a pair of transfer bars, known per se, and provided, at uniform intervals, with seats or blocks for accommodating a connecting rod 14 having a bearing cap.

Frame 10 supports a stationary fixture 16 comprising a massive body extending downwardly to form a stationary, semicircular crescent 18, and a movable fixture 20, also comprising a massive body extending downwardly to form a movable, semicircular crescent 22. The two crescents are arranged in mirror positions with respect to their flat sides, and at right angles to the direction of motion of the movable fixture, so that a circular profile is generated.

Movable fixture 20 is slidable along two horizontal guides 24 (FIGS. 2, 4 and 5) which are integral with frame 10, and is driven by a hydraulic actuator 23, mounted on the frame, through a rod 25, and having the main task of bringing back together the movable crescent to the stationary crescent after fracturing the cap, as well as other accessory tasks as explained below.

Figure 3:
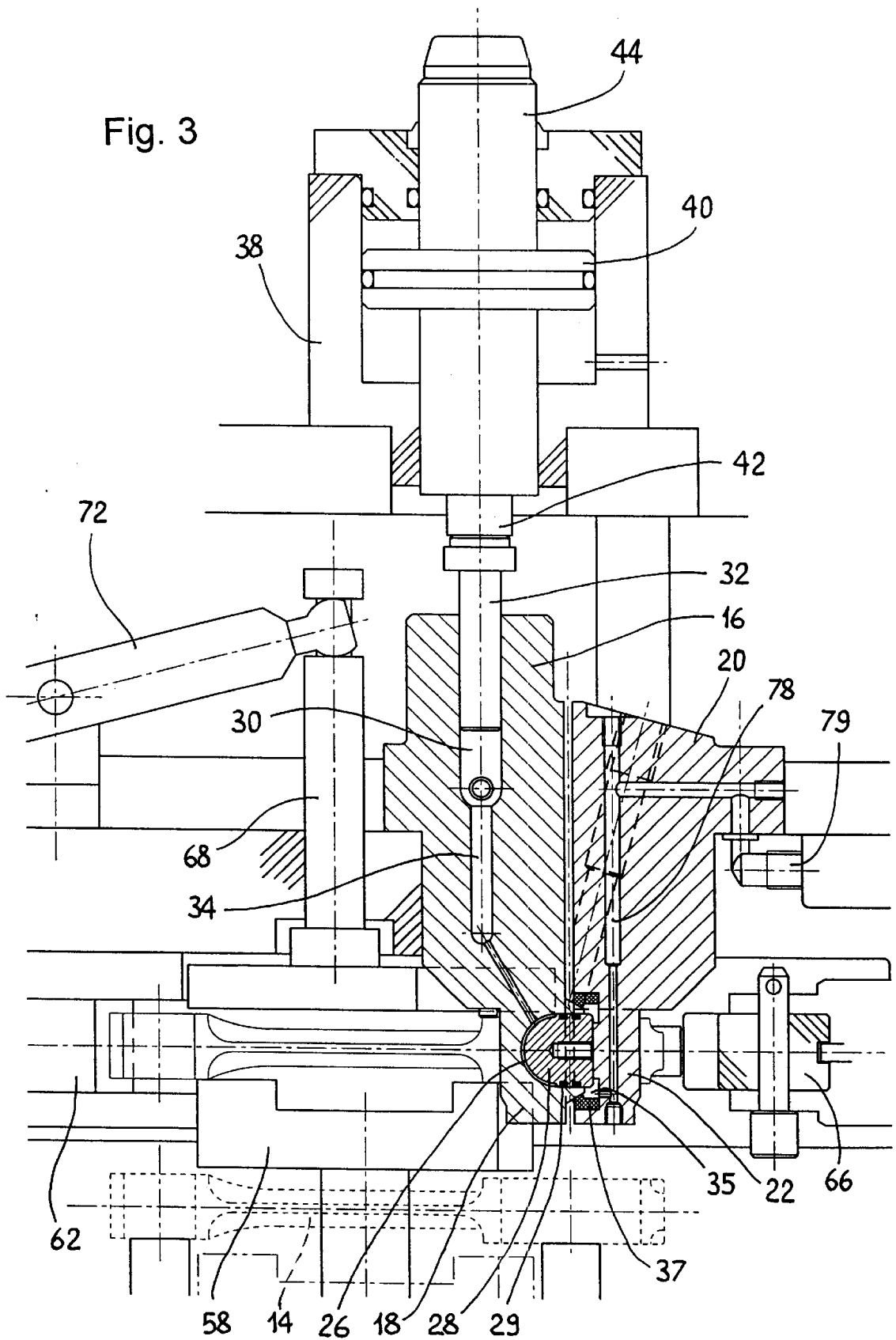
FIG. 3 is a view, on an enlarged scale, of a central portion of FIG. 1.
Figure 4:
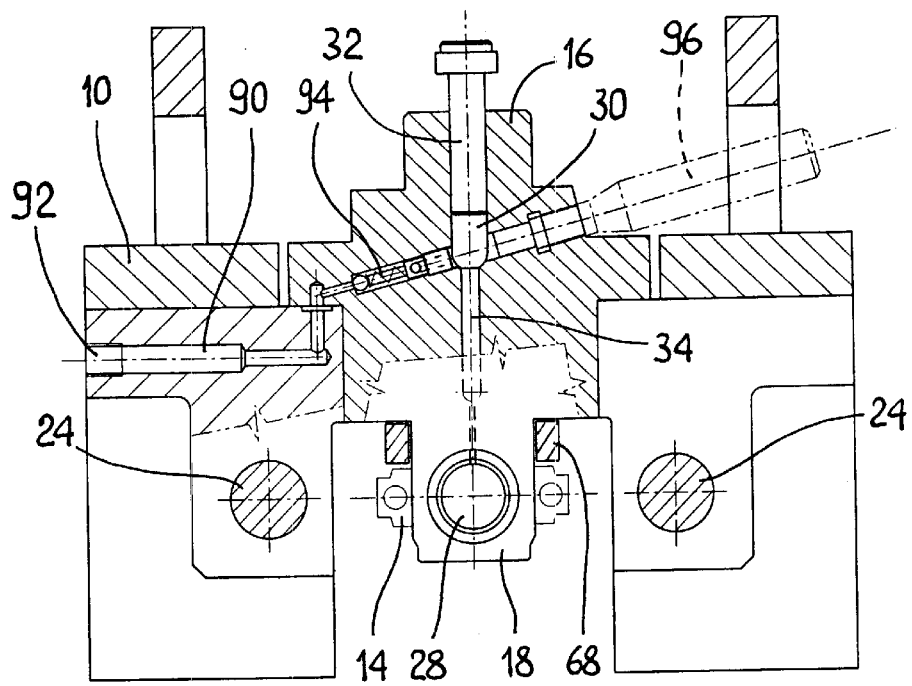
FIG. 4 is a detail view, in cross-section, in the direction of arrow B on FIG. 1.
Figure 5:
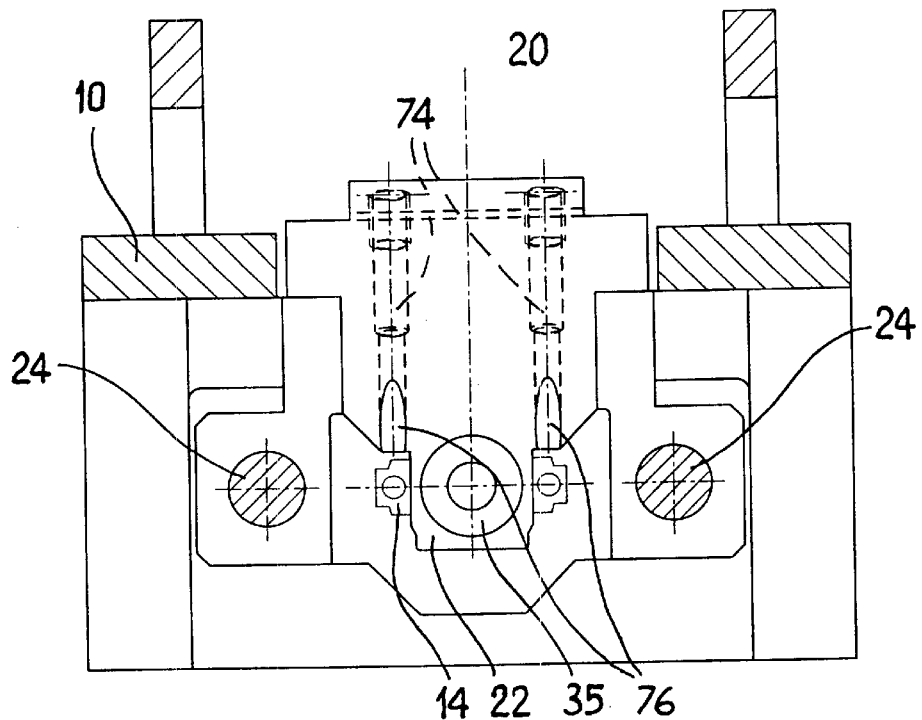
FIG. 5 is a detail view, in cross-section, in the direction of arrow C on FIG. 1.

Having now more particular reference to FIGS. 3, 4 and 5, the flat side of stationary crescent 18 has a chamber 26 within which a piston 28 is sealingly slidable. Piston 28 has a hemispheric crown, is provided with sealing rings 29, and is integrally mounted on the flat side of movable crescent 22, to form a hydraulic actuator for spreading or prying open the crescents. Stationary crescent 18 also contains a vertical, cylindrical reservoir 30 for hydraulic fluid, within which a piston 32 is sealingly slidable, and which is linked to chamber 26 through a conduit 34. Around the piston-mounting area, the surface of crescent 22 has a groove or annular chamber 35, which is externally enclosed by a lip seal 37 abutting against a ridge on crescent 22 so that it defines a collection chamber for any hydraulic fluid leaking from piston 28.

A turret 36, rising from frame 10, accommodates a hydraulic cylinder 38, which is supplied with pressurized hydraulic fluid from a source not shown. Piston 40 of cylinder 38 has a rod 42 facing downwardly, in alignment and in abutment with piston 32, so that both pistons 32 and 40 form together a pressure multiplier the ratio between the cross-section areas of pistons 32 and 40 is preferably in the range 10:1 to 25:1.

Piston 40 also has a rod or projection 44, facing upwardly and arranged to receive the impact of a ram 46, which is slidable in a vertical guide 48. Ram 46 is normally held by a retaining tooth 50, driven by a hydraulic actuator 52, and the fall of the ram is assisted by a spring 54, so that ram 46, when released from tooth 50, is imparted a sharp initial acceleration toward projection 44. After the fall, ram 46 is returned by means of a hydraulic actuator 56, so that it is primed again by hooking on tooth 50.

A jack 58 is arranged to rise from beneath shifting bars 12, under control of an actuator not shown, to engage a connecting rod 14 and lift it off transfer bars 12 to a work position where the big end of the connecting rod is pushed around crescents 18 and 22.

Frame 10 also supports a first locking device comprising a hydraulic actuator 60 which controls, via a non-reversible lead screw, a V-shaped block 62, slidable along guides 63, and arranged for pressing on the small end of connecting rod 14 and therefore to lock the rod body against the stationary crescent.

Movable fixture 20 carries a second locking device, also comprising a hydraulic actuator 64 arranged for pressing both ends of a pivoting rocker 66 against the bolt seats on the bearing cap of the connecting rod, so that the latter is locked against the movable crescent.

Frame 10 also carries a rod ejector comprising a pusher 68 driven by an actuator 70 through a toggle lever 72.

The apparatus comprises a further advantageous device, comprising a dust blower system to blow the dust that may be generated in the fracture, and comprising two oblique conduits such as 74 (FIGS. 3 and 5), which can be connected to a source of pressurized air not shown. The conduits are parallel and oblique, and are drilled in the body of movable fixture 20, and they lead to blower nozzles 76 on the flat side of the movable crescent.

Finally, the apparatus also comprises a draining conduit 78, drilled in the body of the movable fixture, leading from annular chamber 35 to a nipple 79 which is connectable to a suction pump (not shown) for withdrawing the hydraulic fluid leaks accumulating in chamber 35.

In operation, while crescents 18 and 22 are close together and the ram is primed, bars 12 bring a connecting rod 14 in position beneath the above described apparatus. Jack 58 lifts the connecting rod until its big end is pushed around the crescents. Actuator 60 is then driven to engage V-shaped block 62 on the little end, and a moderate pressure is applied to hydraulic actuator 23, in order to lock the big end of the connecting rod, and finally actuator 64 is operated to press rocker 66 against the bearing cap. Both the body and the bearing cap of the connecting rod are therefore locked independently from each other, respectively between block 62 and stationary crescent 18, and between movable crescent 22 and rocker 66.

The pressure in cylinder 23 is now increased, so that the resisting sections between the cap and the body of the connecting rod are pretensioned up to a load slightly lower than the yield stress 46 is now released, in order to apply a pressure peak through the pressure multiplier, such that the cap's breaking stress is rapidly exceeded. The bearing cap is therefore separated from the body of the connecting rod, the movable crescent being quickly moved away from the stationary crescent.

A scouring jet of compressed air is now blown through nozzles 76, in order to clean the fractured surfaces from any dust and loos debris. Ram 46 is then primed by pressurizing the lower chamber of cylinder 56 until tooth 50 is hooked again. The bearing cap is remated to the body of the connecting rod under high pressure by means of actuator 23, the crescents being brought back to their initial positions. The clamps formed by V-shaped block 62 and by rocker 66 are then released, so that connecting rod 14 is freed and is then pushed by ejector 68 and by jack 58 until it rests on bars 12, for transportation to the subsequent processing, more particularly to a subsequent screwing station not shown.

In order to have a braking action to the travel of the movable fixture when the peak of fracturing pressure is applied, a moderate pressure is applied to the back chamber of actuator 23, such that it will not affect the quickness of the fracture, but such that it will present a braking resistance to the travel of the movable crescent after it has been freed by the fracture, by controlling the outlet flow of oil from the back chamber. Alternatively, in order to improve the durability of the device, actuator 23 may also be used to contribute to the fracturing force, by controlling the pressure values in the forward chamber.

Figure 8:
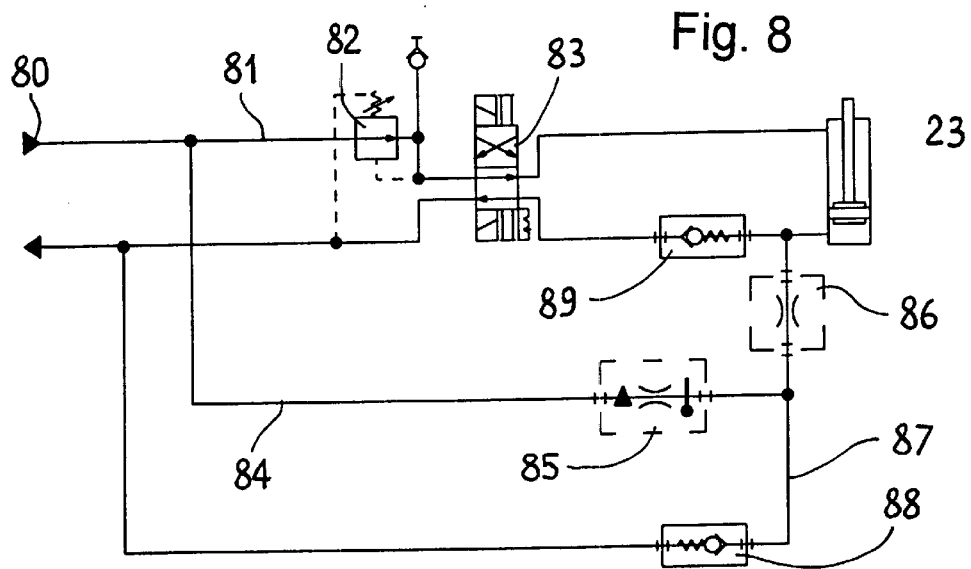
FIG. 8 is a diagram of a hydraulic circuit controlling a hydraulic actuator which is part of the invention.

FIG. 8 diagrammatically shows a hydraulic circuit for controlling hydraulic actuator 23, in order to implement both the function of cap pretensioning and the function of braking and damping the travel of the movable fixture after fracture, as well as the function of remating the crescents. From a source of hydraulic pressure applied to 80, the circuit splits into a first line 81 feeding the forward chamber of actuator 23 through a pressure-reduction valve 82 and a four-way, two-position electrovalve 83, and a second line 84 leading to the back chamber of actuator 23 through a fixed-setting flow regulator 85 and a gauged throttle 86. From the junction of regulator 85 and throttle 86, a conduit 87 leads to drain through a non-return valve 88, set to constant pressure. Finally, the valve 83 is switched, the pressure supply goes to the back chamber of actuator 23 through a second non-return valve 89.

The fracturing cycle is started with electrovalve 83 in the position shown. By applying pressure 80, the forward chamber of actuator 23 (up on FIG. 8) is pressurized, so the pretensioning is created between the cap and the body of the connecting rod, while, at the same time, the back chamber of actuator 23 is also moderately pressurized through line 84. After dropping the ram and separating the cap, the hydraulic fluid contained in the back chamber tends to flow through conduit 87, though it is hindered by throttle 86 and consequently slows down the travel of the movable fixture. After the movable fixture has stopped, electrovalve 83 is switched to pressurize th back chamber of actuator 23, discharging its forward chamber, so that the cap of the connecting rod is brought back to be remated with the body. After the connecting rod has been ejected and the next connecting rod is loaded, electrovalve 83 is switched back to its initial position as shown.

With reference to FIG. 4, the pressure multiplier is also provided with a device to compensate any fluid losses which may arise from leaks, and comprising a conduit 90 joining into conduit 34 from a connector 92, and including a ball check valve 94. This arrangement allows the fluid to be topped up without interfering with the operation of the device. Instead of plug 96, a probe (not shown) can be inserted to monitor the pressure changes.

Figure 6:
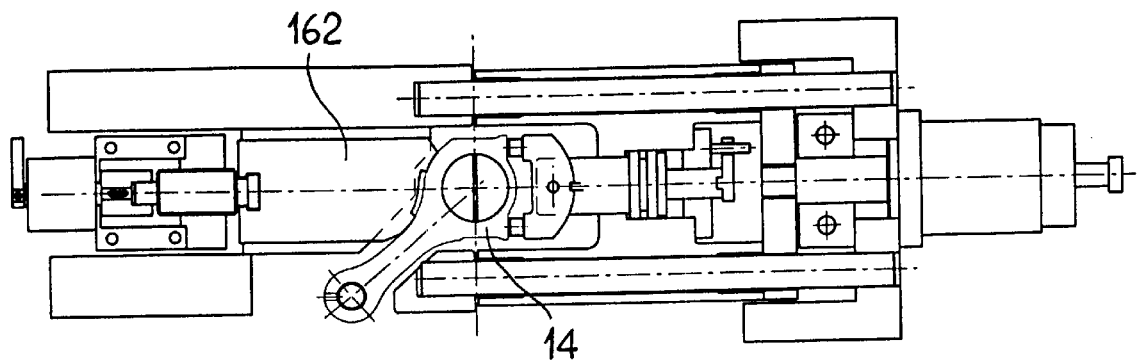
FIG. 6 is a view similar to FIG. 2. concerning a first variation of the apparatus.

FIG. 6 shows a variation of the fracturing device, intended for connecting rods where the fracturing plane is required to be oblique rather than at right angles to the rod body. The device is substantially similar to the one disclosed above, except that V-shaped block 62, clamping the little end, is replaced with a profiled block 162, gauged for pressing with a balanced pressure on the side of the connecting rod.

Figure 7:
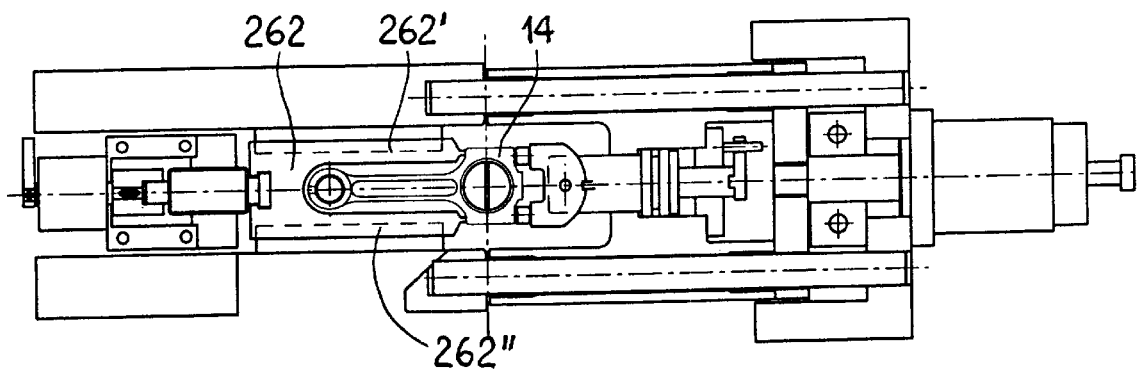
FIG. 7 is a view similar to FIG. 2, concerning a second variation of the apparatus.

FIG. 7 shows another variation, where V-shaped block 62 is replaced with a U-shaped block 262, having two eleongated arms 262', 262" straddling the rod body and abutting against opposite sides of the big end. By this arrangement, the rod body is left unloaded and the elastic behavior of the body does not affect the dynamic system, avoiding possible undesirable effects. Within the spirit of this approach, actuator 60 and block 62 or 262 might be replaced with a pair of cylinders (not shown) abutting on the big end, either directly or through an irreversibility device. Actuator 64 and rocker 66 might also be replaced with a pair of wedge-shaped members (not shown) having equal inclinations and having independent feeding motions, whereby, when they travel at right angles to the fracturing surfaces, they clamp the connecting rod against their respective crescents through the movable members of the big ends. The identical angles of the wedge-shaped members give rise to a smooth travel and a uniform clamping of the big end.

Obviously, a number of other changes can be made to the preferred embodiments as described above, within the teachings of the invention. For instance, although the preferred embodiments provide one movable crescent and one stationary crescent, both crescents might be movable, or alternatively, the crescents might be switched, the crescent associated with the rod body being movable and the crescent associate with the bearing cap being stationary. Moreover, as a way of braking the movable member, conventional stopper devices might be used, as known in the art, instead of a counterpressure in actuator 23. Further, although the arrangement where the connecting rod is horizontal and is lifted from below, according to the embodiments disclosed above, is preferable for ease of loading and unloading of the workpiece and also for ease of disposal of the chips and dust, nevertheless the apparatus might be designed so that the connecting rod is vertical or inclined, or horizontal but loaded from above, with suitable changes in the devices, such as will be obvious for the person skilled in the art. Finally, several of the actuators disclosed in the description might be implemented differently from the examples shown, and in particular they might be mechanical rather than hydraulic.

The disclosures in Italian Patent Application No. TO99A000780 from which this application claims priority are incorporated herein by reference.

What is claimed is:

1. Apparatus for separating the bearing cap of a connecting rod by fracture, comprising:

a frame provided with a first fixture integral with the frame and a second, movable fixture, and which carry respective crescents adapted to be brought together to form a circular profile engageable with the big end of a connecting rod, the frame further having rod-locking means;

spreading means comprising a cylindrical chamber (26) formed in the crescent carried by the first fixture and a piston (28) sealingly slidable in said chamber and abutable against the other crescent, and a conduit (34) located in the first fixture for leading pressurized fluid to said cylindrical chamber;

a pressure multiplier (30, 32, 38, 40, 42) supplied from a source of hydraulic fluid and connected to said conduit (34);

transfer means (58) for transferring a connecting rod from a rod conveyor line (12) to said crescents (18, 22) and vice versa;

first actuator means (60) for pressing at least a first locking member (62, 162, 262) against portions of the rod body in order to lock the rod body against the crescent facing the body;

second actuator means (64) for pressing at least a second locking member (66) against portions of the rod cap in order to block the rod cap against the crescent proximate to the cap;

third actuator means (23, 25) for remating the cap with the body of the connecting rod;

ejector means (68, 70, 72) for ejecting the connecting rod from the crescents and for returning it to the transfer means after its fracturing and remating; wherein the apparatus further comprises a ram (46) biased by accelerating means to apply an impulsive action to said pressure multiplier, and retainable to a primed position by a movable tooth (50) driven by fourth actuator means (52) to release the ram, the ram being returnable to said primed position by fifth actuator means (56).

2. The apparatus for separating the bearing cap of a connecting rod according to claim 1, wherein said ram (46) is biased by elastic means (54).

3. The apparatus for separating the bearing cap of a connecting rod according to claim 1, wherein said first locking member is a V-shaped block (62) adapted to press against the little end of the connecting rod.

4. The apparatus for separating the bearing cap of a connecting rod according to claim 1, wherein said first locking member is a profiled block (162) adapted to press obliquely onto portions of the rod body, for the oblique fracture of the cap.

5. The apparatus for separating the bearing cap of a connecting rod according to claim 1, wherein said first locking member is a U-shaped block (262) having two arms adapted to press against opposite sides the little end of the connecting rod.

6. The apparatus for separating the bearing cap of a connecting rod according to claim 1, wherein said second locking member is a pivoted rocker (66) having opposite ends for pressing on opposite sides of the cap of the connecting rod.

7. The apparatus for separating the bearing cap of a connecting rod according to claim 1, further comprising blowing means for scouring the fracture surfaces of the rod cap, consisting of at least one conduit (74) for leading compressed air to nozzles (76) opening in one of the crescents in places that are in front of the fracture areas of the cap.

\* \* \* \* \*